(12) United States Patent
Cavelius et al.

(10) Patent No.: US 12,269,332 B2
(45) Date of Patent: Apr. 8, 2025

(54) CHARGING VEHICLE FOR A STACK STORAGE ASSEMBLY

(71) Applicant: Jungheinrich Aktiengesellschaft, Hamburg (DE)

(72) Inventors: Jörg Cavelius, Bad Vilbel (DE); Michael Becker, Hainburg (DE); Markus Liebhaber, Oberursel (DE); Timm Morawietz, Tholey-Überroth (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 774 days.

(21) Appl. No.: 17/411,548

(22) Filed: Aug. 25, 2021

(65) Prior Publication Data
US 2022/0063387 A1 Mar. 3, 2022

(30) Foreign Application Priority Data
Aug. 26, 2020 (EP) ..................... 20192811

(51) Int. Cl.
B60K 1/02 (2006.01)
B60L 53/00 (2019.01)
(Continued)

(52) U.S. Cl.
CPC ............... B60K 1/02 (2013.01); B60L 53/00 (2019.02); B66F 9/00 (2013.01); B66F 9/07572 (2013.01); B66F 9/20 (2013.01)

(58) Field of Classification Search
CPC ..... B60K 1/02; B66F 9/00; B66F 9/20; B66F 9/07572
See application file for complete search history.

(56) References Cited

U.S. PATENT DOCUMENTS 10,351,344 B2  7/2019  Gebhardt et al.
11,479,407 B2  10/2022 Austrheim et al.
(Continued)

FOREIGN PATENT DOCUMENTS

CA      3086277      7/2019
CN      108529493    9/2018
(Continued)

OTHER PUBLICATIONS

Europe Office Action conducted in counterpart Europe Appln. No. 20 192 811.6 (Nov. 14, 2023).
(Continued)

Primary Examiner — James A English
Assistant Examiner — Michael R Stabley
(74) Attorney, Agent, or Firm — GREENBLUM & BERNSTEIN, P.L.C.

(57) ABSTRACT

A charging vehicle for a stack storage assembly includes a chassis; a first impeller assembly structured and arranged to move the chassis in a first direction; a second impeller assembly structured and arranged to move the chassis in a second direction transverse to the first direction; and a hoisting device comprising a hoisting drive acting perpendicularly to the first direction and to the second direction. The hoisting device has a hoisting platform movable, with the hoisting drive, upwardly in the direction of gravity from an initial position into a lifted position. The hoisting drive acts downwardly on the second impeller assembly in the direction of gravity and downwardly moves the second impeller assembly beyond the first impeller assembly.

10 Claims, 1 Drawing Sheet

(51) Int. Cl.
*B66F 9/00* (2006.01)
*B66F 9/075* (2006.01)
*B66F 9/20* (2006.01)

(56) References Cited

U.S. PATENT DOCUMENTS

| | | |
|---|---|---|
| 11,548,731 B2 | 1/2023 | Austrheim et al. |
| 2014/0086714 A1 | 3/2014 | Malik |
| 2019/0119049 A1 | 4/2019 | King et al. |
| 2020/0013956 A1 | 4/2020 | Redman |

FOREIGN PATENT DOCUMENTS

| | | |
|---|---|---|
| CN | 110092324 | 8/2019 |
| CN | 209583531 | 11/2019 |
| EP | 3053855 | 8/2016 |
| WO | 2019/238703 | 12/2019 |

OTHER PUBLICATIONS

China Search Report/Office Action conducted in counterpart China Appln. No. 202110988226 (Dec. 28, 2023).

CHARGING VEHICLE FOR A STACK STORAGE ASSEMBLY

CROSS-REFERENCE TO RELATED APPLICATION

This application claims the right of foreign priority under 35 U.S.C. § 119(a) to Europe Application No. EP 20192811.6 filed Aug. 26, 2020, the disclosure of which is expressly incorporated by reference herein in its entirety.

BACKGROUND

1. Field of the Invention

The present invention relates to a charging vehicle for a stack storage assembly with a chassis, a first impeller (wheel) assembly, with which the charging vehicle can be moved in a first direction, a second impeller (wheel) assembly, with which the charging vehicle can be moved in a second direction transverse to the first direction, and a hoisting device, which has a hoisting drive that acts perpendicularly to the first direction and to the second direction.

2. Discussion of Background Information

For example, such a charging vehicle is known from WO 2019/238703 A1, the disclosure of which is incorporated by reference in its entirety.

The known charging vehicle is moved above a stack storage assembly. Container stacking spaces are arranged in the stack storage assembly in the form of a matrix in rows and columns. So that the charging vehicle can reach all container stacking spaces, a rail system is installed above the stack storage assembly, and has a first group of rails that run in the direction of the rows, and a second group of rails that run in the direction of the columns. The first impeller assembly then interacts with the first group of rails. The second impeller assembly interacts with the second group of rails. A switch is made between the first rail assembly and the second rail assembly by downwardly pushing the second impeller assembly out of the chassis, and having it engage with the second group of rails.

However, activating the second impeller assembly requires a drive that is capable of downwardly moving the second impeller assembly out of the charging vehicle against the weight of the charging vehicle, if necessary with the received container. This requires a relatively high outlay.

SUMMARY

Embodiments are directed to a simple and cost-effective charging vehicle.

In embodiments, the hoisting device of the charging vehicle has a hoisting platform, which, with the hoisting drive, can be relocated upwardly in the direction of gravity from an initial position into a lifted position. The hoisting drive acts downwardly on the second impeller (wheel) assembly in the direction of gravity and downwardly relocates the second impeller assembly beyond the first impeller (wheel) assembly.

This charging vehicle is used in a stack storage assembly, in which a charging space is arranged under the container stacking spaces. The containers are thus stored in the container stacking spaces from below, and downwardly removed from the container stacking spaces. The container stacking spaces are arranged in the form of a matrix with rows and columns here as well. The charging vehicle can then be moved with the first impeller assembly in the direction of the rows, for example, and with the second impeller assembly in the direction of the columns. In order to store a container, the charging vehicle is driven under a container stacking space. The container located on the charging vehicle, more precisely on the hoisting platform, is lifted until it passes a retaining device arranged at the lower end of a container stacking space. If the container has passed the retaining device and the hoisting platform is lowered, the retaining device holds the container. If one or several containers are already located in the container stacking space, the container to be stored also lifts these containers, and then forms the lowermost container of a stack. If the container is to be taken out, the charging vehicle once again goes into action, and with its hoisting platform lifts the lowermost container of a stack until it is released from the retaining device. The retaining device is then kept open, and the hoisting platform with the container or container stack located thereon is lowered until the container to be removed has passed by the retaining device. The retaining device is then activated again, and holds the remaining containers in the container stacking space.

In the present case, the hoisting device has a second function. It serves not only to lift and lower the hoisting platform, but also to press the second impeller assembly downward, so that the charging vehicle, once the second impeller assembly has been downwardly relocated beyond the first impeller assembly, can be moved on the second impeller assembly. As a consequence, the charging vehicle can be moved in two directions. An additional drive for relocating the second impeller assembly is not necessary. The hoisting drive that activates the hoisting platform must be able to lift and lower a container anyway. Therefore, it can also be dimensioned in such a way without any major effort as to also be able to handle the additional weight of the charging vehicle.

The hoisting drive preferably acts on the second impeller assembly via the hoisting platform. The hoisting drive must thus not be mechanically switched over so as to act on the hoisting platform on the one hand and the second impeller assembly on the other. This yields a simple structural design.

The hoisting platform can preferably be downwardly relocated from the initial position in the direction of gravity via the hoisting drive. If the second impeller assembly is to be downwardly relocated beyond the first impeller assembly, the hoisting platform is likewise lowered a certain distance. This is also possible when the container is located on the hoisting platform. The container is then at most moved further into the charging vehicle, so that it poses no obstruction while the charging vehicle travels in the second direction.

A spring assembly is preferably provided between the chassis and the second impeller assembly, and acts against the effect of the hoisting drive directed downwardly in the direction of gravity. Therefore, the hoisting drive need only be able to downwardly press the second impeller assembly out of the first impeller assembly. The effect of the spring assembly causes the second impeller assembly to move back in such a way that the charging vehicle can thereafter traverse the first impeller assembly.

It is here preferred that the spring assembly have a spring element, in particular a pressure spring. The pressure spring is compressed when the second impeller assembly is lowered beyond the first impeller assembly. It relaxes when the second impeller assembly is lifted again. The spring element stores energy in a different way if the spring element has a different design.

The second impeller assembly preferably has at least one impeller, which is arranged on a swing arm. The arrangement on a swing arm facilitates the relocation of the second impeller assembly. The swing arm is pivoted to the chassis. The impeller is at a specific distance from the rotational axis, which connects the swing arm with the chassis. If the swing arm is then pivoted, the second impeller can be moved without any problem.

The swing arm is preferably suspended from the chassis in a central area in the second direction. Accordingly, the second impeller is located in an outer area of the charging vehicle, which has a positive effect on the stability of the charging vehicle while traveling. The danger that the charging vehicle will tilt is kept low.

The hoisting platform preferably acts on the swing arm. This is a relatively easy way to pivot the swing arm.

It is here preferred that the hoisting platform act on the swing arm via a ball assembly and a ball support. As a result, the friction between the hoisting platform and the swing arm is kept low. This has a favorable effect on any potential wear.

The hoisting drive preferably has a push chain, which acts with pressure on the hoisting platform given an upward motion of the hoisting platform from the initial position in the direction of gravity, and acts with traction on the hoisting platform given a downward movement of the hoisting platform from the initial position in the direction of gravity. This type of application is possible because the push chain can be exposed to both traction and pressure.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
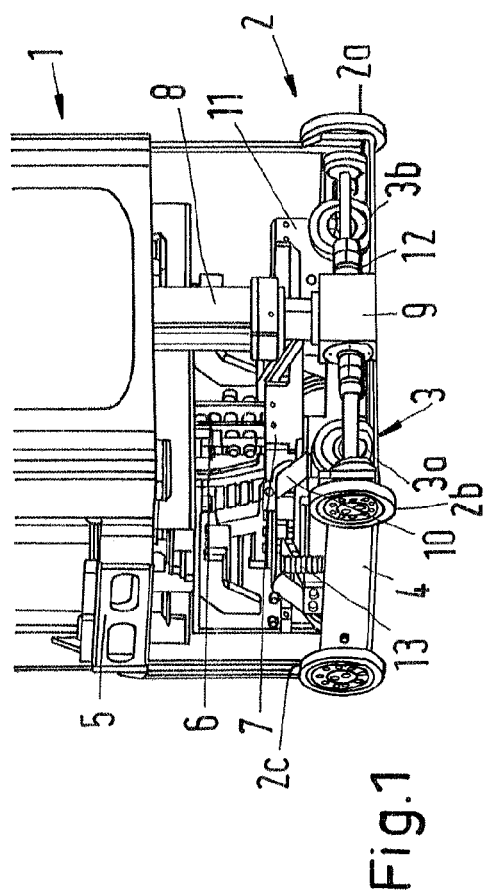
FIG. 1 shows a schematic, perspective view of a charging vehicle with a first impeller assembly and a second impeller assembly.

FIG. 1 shows a schematic view of a charging vehicle 1, which can be used in a stack storage assembly to store containers into container stacking spaces from below, and to remove containers from the container stacking spaces from below.

The charging vehicle has a first impeller (wheel) assembly 2 with first impellers (wheels) 2a, 2b, 2c and a second impeller (wheel) assembly 3 with second impellers (wheels) 3a, 3b. The first impellers 2a-2c are fastened to a chassis 4. The charging vehicle 1 can be moved in a first direction with the first impeller assembly 2. The second impellers 3a, 3b of the second impeller assembly 3 are vertically aligned to the first impellers 2a-2c. The charging vehicle 1 can be moved in a direction perpendicular or transverse to the first direction with the second impeller assembly 3.

The charging vehicle 1 further has a hoisting device, with which it is able to store a container (not shown in more detail) from below into a container stacking space of a stack storage assembly or to remove the container from the container stacking space from below. To this end, the charging vehicle 1 has a hoisting platform 5, which can be lifted by a hoisting device. In the present case, the hoisting device has a push chain 6. The push chain 6 is driven by a drive motor 7. The hoisting platform 5 can be guided by a guide 8.

The first impellers 2a-2c are arranged directly on the chassis 4. They can be driven by a traction drive 9.

The second impellers 3a, 3b are each arranged on a swing arm 10, 11, wherein the swing arms 10, 11 are pivoted to the chassis 4. A pivot point 12 is discernible only for the swing arm 11.

The swing arms 10, 11 are supported on the chassis 4 via pressure springs 13, 14. Without exposure to other forces, the pressure springs 13, 14 cause the second impellers 3a, 3b to be pivoted into the inactive position shown on FIG. 2, in which the charging vehicle 1 can only be moved on the first impeller assembly 2.

The push chain 6 is fixedly connected with the hoisting platform 5. The lower side of the hoisting platform 5 (the directional indications "above" and "below" relate to the direction of gravity) is provided with a ball transfer assembly 15. The upper side of the swing arms 10, 11 has a ball support 16.

Figure 2:
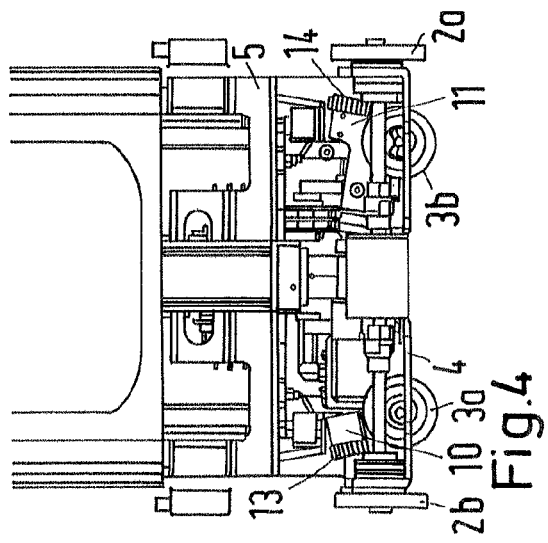
FIG. 2 shows is a schematic side view of the charging vehicle in a state in which the first impeller assembly is active.

FIG. 2 shows an initial position of the hoisting platform 5. The initial position of the hoisting platform 5 is a position in which a container received on the hoisting platform is moved in the charging space during transport in the first direction, while the charging vehicle 1 rolls on the first impeller assembly 2. The hoisting platform 5 can be moved upwardly out of this initial position, so as to store the container in a container stacking space or remove the container from there.

Figure 3:
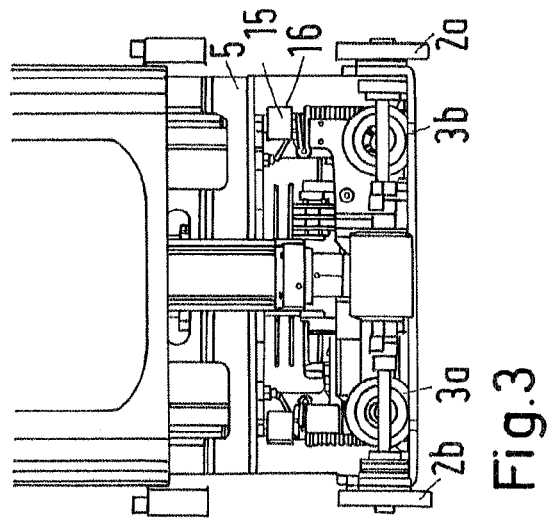
FIG. 3 shows is a schematic side view of the charging vehicle in a state in which a switch is made between the first impeller assembly and the second impeller assembly.
Figure 4:
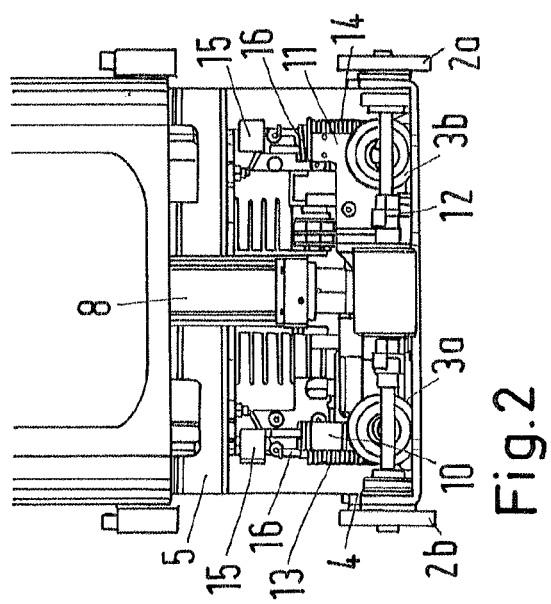
FIG. 4 shows is a schematic side view of the charging vehicle in a state in which the second impeller assembly is active.

However, the hoisting platform 5 can also be downwardly relocated from the initial position with the help of the push chain 6. The ball transfer assembly 15 here comes into contact with the ball support 16, as shown on FIG. 3. If the hoisting platform 5 is further lowered as shown on FIG. 4, the swing arms 10, 11 are pivoted relative to the chassis, and thereby move the second impellers 3a, 3b downwardly beyond the first impellers 2a, 2b. During this movement, the pressure springs 13, 14 are compressed, and the chassis 4 is lifted. The charging vehicle 1 can then be moved on the second impeller assembly 3.

If the first impeller assembly is to be activated once more, the hoisting platform 5 is again lifted. This lifting can be accomplished solely by the force of the pressure springs 13, 14 given the appropriate dimensioning. However, it is also possible to use the hoisting drive with the push chain 6 for this movement. If the hoisting platform 5 is lifted, the swing arms 10, 11 are pivoted back, and the second impellers 3a, 3b are lifted relative to the chassis (or the chassis 4 is lowered relative to the second impellers 3a, 3b), so that the first impeller assembly 2 becomes active again.

At least while lifting the hoisting platform 5 upwardly out of the initial position, the push chain 6 acts with pressure on the hoisting platform 5. By contrast, if the hoisting platform 5 is downwardly relocated out of the initial position, the push chain 6 acts with traction on the hoisting platform 5.

The pivoting axis 12 of the swing arms 10, 11 is arranged in a central area of the chassis 4. In other words, the swing arms 10, 11 are suspended on the chassis 4 in a central area. This in turn allows the second impellers 3a, 3b to be arranged relatively far outside on the charging vehicle, so that the charging wheels 3a, 3b (and their corresponding pair on the other side of the charging vehicle 1) comprise a relatively large footprint. This has a positive effect on the stability of the charging vehicle 1.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A charging vehicle for a stack storage assembly comprising:
    a chassis;
    a first wheel assembly structured and arranged to move the chassis in a first direction;
    a second wheel assembly structured and arranged to move the chassis in a second direction transverse to the first direction;
    a hoisting device comprising a hoisting drive acting perpendicularly to the first direction and to the second direction, and
    a spring assembly between the chassis and the second wheel assembly,
    wherein the hoisting device has a hoisting platform movable, with the hoisting drive, upwardly in an opposite direction of gravity from an initial position into a lifted position,
    wherein the hoisting drive acts downwardly on the second wheel assembly in a direction of gravity and downwardly moves the second wheel assembly beyond the first wheel assembly; and
    wherein the spring assembly is structured and arranged to act against an effect of the hoisting drive directed downwardly in the direction of gravity.

2. The charging vehicle according to claim 1, wherein the hoisting drive acts on the second wheel assembly via the hoisting platform.

3. The charging vehicle according to claim 2, wherein the hoisting platform is downwardly movable from the initial position in the direction of gravity via the hosting drive.

4. The charging vehicle according to claim 1, wherein the spring assembly comprises a spring element.

5. The charging vehicle according to claim 4, wherein the spring element comprises a pressure spring.

6. A charging vehicle for a stack storage assembly comprising:
    a chassis;
    a first wheel assembly structured and arranged to move the chassis in a first direction;
    a second wheel assembly structured and arranged to move the chassis in a second direction transverse to the first direction; and
    a hoisting device comprising a hoisting drive acting perpendicularly to the first direction and to the second direction,
    wherein the hoisting device has a hoisting platform movable, with the hoisting drive, upwardly in an opposite direction of gravity from an initial position into a lifted position, and
    wherein the hoisting drive acts downwardly on the second wheel assembly in a direction of gravity and downwardly moves the second wheel assembly beyond the first wheel assembly, and
    wherein the second wheel assembly comprises at least one wheel arranged on a swing arm.

7. The charging vehicle according to claim 6, wherein the swing arm is suspended from the chassis in a central area in the second direction.

8. The charging vehicle according to claim 6, wherein the hoisting platform acts on the swing arm.

9. The charging vehicle according to claim 8, wherein the hoisting platform acts on the swing arm via a ball assembly and a ball support.

10. A charging vehicle for a stack storage assembly comprising:
    a chassis;
    a first wheel assembly structured and arranged to move the chassis in a first direction;
    a second wheel assembly structured and arranged to move the chassis in a second direction transverse to the first direction; and
    a hoisting device comprising a hoisting drive acting perpendicularly to the first direction and to the second direction,
    wherein the hoisting device has a hoisting platform movable, with the hoisting drive, upwardly in an opposite direction of gravity from an initial position into a lifted position, and
    wherein the hoisting drive acts downwardly on the second wheel assembly in a direction of gravity and downwardly moves the second wheel assembly beyond the first wheel assembly, and
    wherein the hoisting drive comprises a push chain, which acts with pressure on the hoisting platform given an upward motion of the hoisting platform from the initial position in the direction of gravity, and acts with traction on the hoisting platform given a downward movement of the hoisting platform from the initial position in the direction of gravity.

* * * * *